(12) United States Patent
Park et al.

(10) Patent No.: US 7,031,356 B2
(45) Date of Patent: Apr. 18, 2006

(54) TEMPERATURE CONTROLLER IN OPTICAL COMMUNICATION DEVICE AND METHOD FOR SAME

(75) Inventors: Tae-Sung Park, Suwon-shi (KR); Chan-Youl Kim, Puchon-shi (KR); Jong-Hun Lee, Suwon-shi (KR); Sung-Il Sohn, Seoul (KR)

(73) Assignee: Samsung Electronics Co Ltd, Suwon-si (KR)

( * ) Notice: Subject to any disclaimer, the term of this patent is extended or adjusted under 35 U.S.C. 154(b) by 221 days.

(21) Appl. No.: 10/642,703

(22) Filed: Aug. 18, 2003

(65) Prior Publication Data

US 2004/0047397 A1    Mar. 11, 2004

(30) Foreign Application Priority Data

Sep. 9, 2002    (KR) .................. 10-2002-0054184

(51) Int. Cl.
*H01S 3/04* (2006.01)
(52) U.S. Cl. .......................... 372/34; 374/141
(58) Field of Classification Search ................ 372/34; 374/141; 702/99; 709/99
See application file for complete search history.

(56) References Cited

U.S. PATENT DOCUMENTS 4,739,467 A * 4/1988 Furusawa ............. 700/28

6,798,341 B1 * 9/2004 Eckel et al. ............. 340/521

FOREIGN PATENT DOCUMENTS

| EP | 0703679 A2 | 3/1996 |
| FR | 2288279 | 10/1974 |

* cited by examiner

*Primary Examiner*—Minsun Oh Harvey
*Assistant Examiner*—Tod T. Van Roy
(74) *Attorney, Agent, or Firm*—Cha & Reiter LLC

(57) ABSTRACT

Disclosed is a temperature controller and method for maintaining an optical-communication device at a constant temperature regardless of ambient temperature variation. The temperature controller includes: a temperature sensor for detecting the current temperature of a device which is to be temperature-controlled; and, a temperature-comparison section for comparing the current temperature detected by the temperature sensor with the predetermined temperature that is a proper operating temperature for the device, wherein the temperature-comparison section further includes: a differential amplifier for outputting the difference between signals which are inputted respectively into anode and cathode terminals; and first, second, third, and fourth resistance pads which are selectively short-circuited with one another according to the temperature-sensor type so as to vary the polarity of the signals inputted into the differential amplifier so that PTC and NTC sensors can be used at the same time in a single PCB regardless of the temperature-sensor type.

5 Claims, 5 Drawing Sheets

TEMPERATURE CONTROLLER IN OPTICAL COMMUNICATION DEVICE AND METHOD FOR SAME

CLAIM OF PRIORITY

This application claims priority to an application entitled "TEMPERATURE CONTROLLER IN OPTICAL COMMUNICATION DEVICE," filed in the Korean Intellectual Property Office on Sep. 9, 2002 and assigned Serial No. 2002-54184, the contents of which are hereby incorporated by reference.

BACKGROUND OF THE INVENTION

1. Field of the Invention

The present invention relates to a temperature controller designed to maintain an optical-communication device at a constant temperature regardless of ambient temperature variations.

2. Description of the Related Art

In general, optical-communication devices such as a laser diode and an Arrayed Wavelength Grating (hereinafter referred to as AWG) which are used in Wavelength Division Multiplexing (hereinafter referred to as WDM) are sensitive to ambient temperature variations. It is preferred that optical-communication devices as described above employ a temperature controller to maintain a constant temperature, so as to restrict the wavelength transition of a transmitted optical signal and stabilize the wavelength of a demultiplexed optical signal in a W DM optical transmission and a WDM-PON (Passive Optical Network) transmission, thereby realizing a stable optical system free from interference from adjacent optical channels.

FIG. 1 is a block diagram showing the construction of a temperature controller in a general optical-communication device, in which the temperature controller includes a temperature sensor 10, a temperature-comparison section 20, a PID control section 30, a current-supply section 40, and a temperature-control section 50.

The temperature sensor 10 detects the current temperature of an optical-communication device 60 such as the AWG. The temperature sensor utilizes a thermistor, or Pt-resistance temperature detector, whose resistance varies according to temperature variations. The Pt-resistance temperature detector has a Positive Temperature Coefficient (hereinafter referred to as PTC) in which its resistance increases as the temperature rises. The thermistor has a PTC or Negative Temperature Coefficient (hereinafter referred to as NTC) according to the composition of the materials thereof.

The temperature-comparison section 20 compares a predetermined temperature with a current temperature and generates an error voltage $V_{err}$ corresponding to the difference between the predetermined and current temperature voltages. The temperature controller establishes the predetermined temperature by applying a voltage with a general-purpose microcontroller and a Digital-to-Analog Converter (DAC) or directly applying a reference voltage $V_{ref}$. The temperature controller reads the resistance of the temperature sensor 10 attached to the optical-communication device 60, such as the AWG, converts the resistance into a current voltage $V_{cur}$, and then compares the current voltage $V_{cur}$ with that of the predetermined temperature so as to obtain the current temperature. The compared error voltage is applied to the PID control section 20.

The PID control section 30 receives the error voltage from the temperature-comparison section, adjusts an output voltage so as to conform the current temperature to the predetermined temperature, and applies the output voltage into the current supply section 40. The PID control section may selectively use P-, PI-, PD-, PID-control circuits, and so forth according to temperature variation characteristics.

The current-supply section 40 amplifies the output voltage from the PID control section 30 into a high current using a power operational amplifier (hereinafter referred to as OPA) or a PWM (Pulse Width Modulation) driver, and supplies the high current to the temperature-control section 50.

The temperature-control section 50 controls the temperature of the optical-communication device 60, based upon the high current applied from the current-supply section 40. The polarity of the current applied to the temperature control section 50 is determined by the polarity of the error voltage $V_{err}$ which is the difference between the predetermined and the current temperature voltages in the temperature-comparison section 20. If the error voltage indicates a positive voltage, a positive current is generated. If the error voltage indicates a negative voltage, a negative current is generated. Such a temperature controller may include a heater, a Thermo-Electric Cooler (hereinafter referred to as TEC), etc. In general, the TEC is in the form of a device for heating or cooling an object to be temperature-controlled, and it is used to maintain the temperature of a WDM laser diode. The TEC or heater is used for the AWG, in which the heater heats an object to be temperature-controlled regardless of the polarity of the applied current.

In the temperature controller having the above construction, it compares the current temperature voltage with the predetermined temperature voltage using an Instrument Amplifier (hereinafter referred to as IA) circuit so that any error can be amplified precisely via the OP amplifier and the differential amplifier using the OPA.

FIG. 2 is a diagram showing a construction of the temperature-comparison section of a temperature controller employed in a conventional optical-communication device. First, the case where the temperature-comparison section utilizes an IA and employs a Pt-resistance temperature detector as a temperature sensor will be described below.

The Pt-resistance temperature detector shows a PTC characteristic, that is a resistance variation according to the temperature, in which the resistance thereof is 100 Ω at 0° C. and increases by 0.385 Ω for each 1° C. rise in temperature.

In conversion of a resistance of the Pt-resistance temperature detector into a voltage, where it is supposed that a reference voltage Vref is 3V, a resistance R is 100 Ω, and a predetermined temperature is 70° C., a predetermined temperature voltage V1 is set as 1.678V and is inputted into an anode terminal of the IA 21 while a current temperature voltage is inputted into a cathode terminal of the IA 21. Then, an output-error voltage 22 of the temperature-comparison section is applied with a positive polarity into a heater or a TEC having a temperature-maintenance function with the positive polarity current at a current-supply terminal, so as to maintain a desired temperature.

Next, the temperature-comparison section may utilize a thermistor 51 having an NTC characteristic. The thermistor shows a resistance of 100 kΩ at 25° C. and approximately 14.6 kΩ at 70° C. Where R is 100 kΩ, the voltage of the set temperature is approximately 0.382V. The set temperature is inputted into the cathode terminal of the IA while the current temperature voltage is inputted into an anode terminal of the IA so as to supply the current to the TEC or heater through the PID control.

The current temperature voltage increases, approaching the predetermined temperature in the PTC sensor as set forth above, while the current temperature voltage decreases to approach the predetermined temperature in the NTC sensor. That is, the current temperature voltage is inputted into the anode terminal of the IA in the case of the PTC sensor but into the cathode terminal of the IA in the case of the NTC sensor thereby restricting application of the NTC and PTC sensors in a single PCB at the same time.

SUMMARY OF THE INVENTION

The present invention is to provide a temperature controller in an optical-communication device, which can incorporate a PTC sensor and an NTC sensor simultaneously, even while using a single PCB, regardless of the type of the temperature sensor.

One aspect of the present invention is to provide a temperature controller in an optical-communication device, including: a temperature sensor for detecting the current temperature of a device which is to be temperature-controlled; and, a temperature-comparison section for comparing the current temperature detected by the temperature sensor with a predetermined temperature that is a proper operating temperature for the device, wherein the temperature-comparison section further includes: a differential amplifier for outputting the difference between signals which are inputted respectively into anode and cathode terminals; a first resistance pad connected to the temperature sensor; a second resistance pad connected to the anode terminal of the differential amplifier and spaced apart from the first resistance pad; a third resistance pad connected to the cathode terminal of the differential amplifier and spaced apart from the first and second resistance pads; and, a fourth resistance pad for receiving a signal corresponding to the set temperature and spaced apart from the first, second, and third resistance pads, wherein the first to fourth resistance pads are selectively short-circuited with one another according to the temperature-sensor type so as to vary the polarity of the signals inputted into the differential amplifier.

In the embodiment, the temperature sensor includes a PTC sensor, and the first and second resistance pads are short-circuited with each other, and the third and fourth resistance pads are short-circuited with each other. The temperature sensor includes an NTC sensor, and the first and third resistance pads are short-circuited with each other, and the second and fourth resistance pads are short-circuited with each other. Further, the temperature controller further includes at least one resistor of 0 Ω for short-circuiting the resistance pads with one another.

In another embodiment of the present invention, a method of maintaining the temperature of an optical-communication device is provided. The method includes the steps of: detecting the current temperature of a device which is to be temperature-controlled;

comparing the current temperature to a predetermined temperature to be maintained; generating a signal which represents the difference between the current temperature and the predetermined temperature; and, providing four resistance pads which are selectively short-circuited with one another according to the temperature-sensor type so as to vary the polarity of the signals inputted into the differential amplifier.

DETAILED DESCRIPTION OF THE PREFERRED EMBODIMENTS

Figure 1:
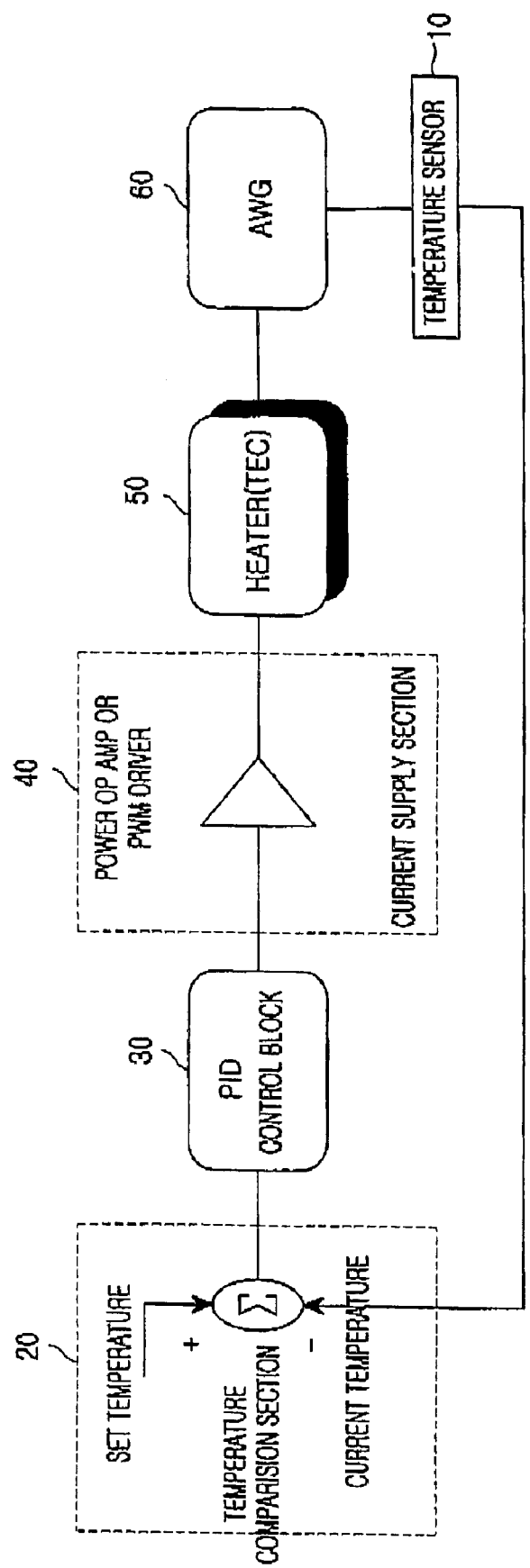
FIG. 1 is a block diagram illustrating the construction of a temperature controller in a general optical-communication device.
Figure 2:
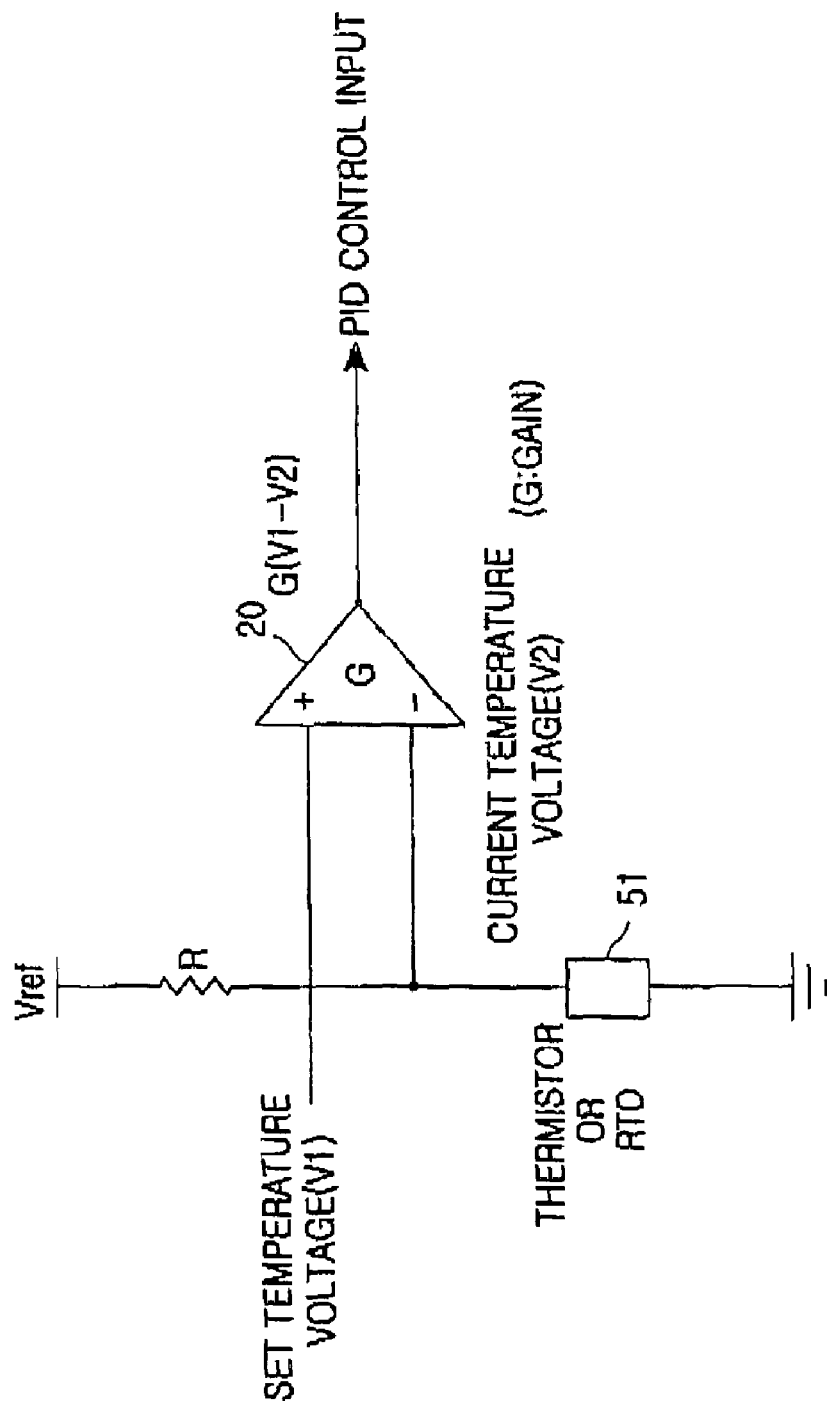
FIG. 2 illustrates the temperature-comparison section of a temperature controller in a general optical-communication device.

In accordance with the present invention, a preferred embodiment of the present invention will be described in detail with reference to FIGS. 3 to 5. In these drawings, it is to be understood that like reference numerals or symbols refer to like elements even though they are shown in different drawings. For the purposes of clarity and simplicity, well-known functions or constructions will not be described in detail as they would unnecessarily obscure the understanding of the invention.

Figure 3:
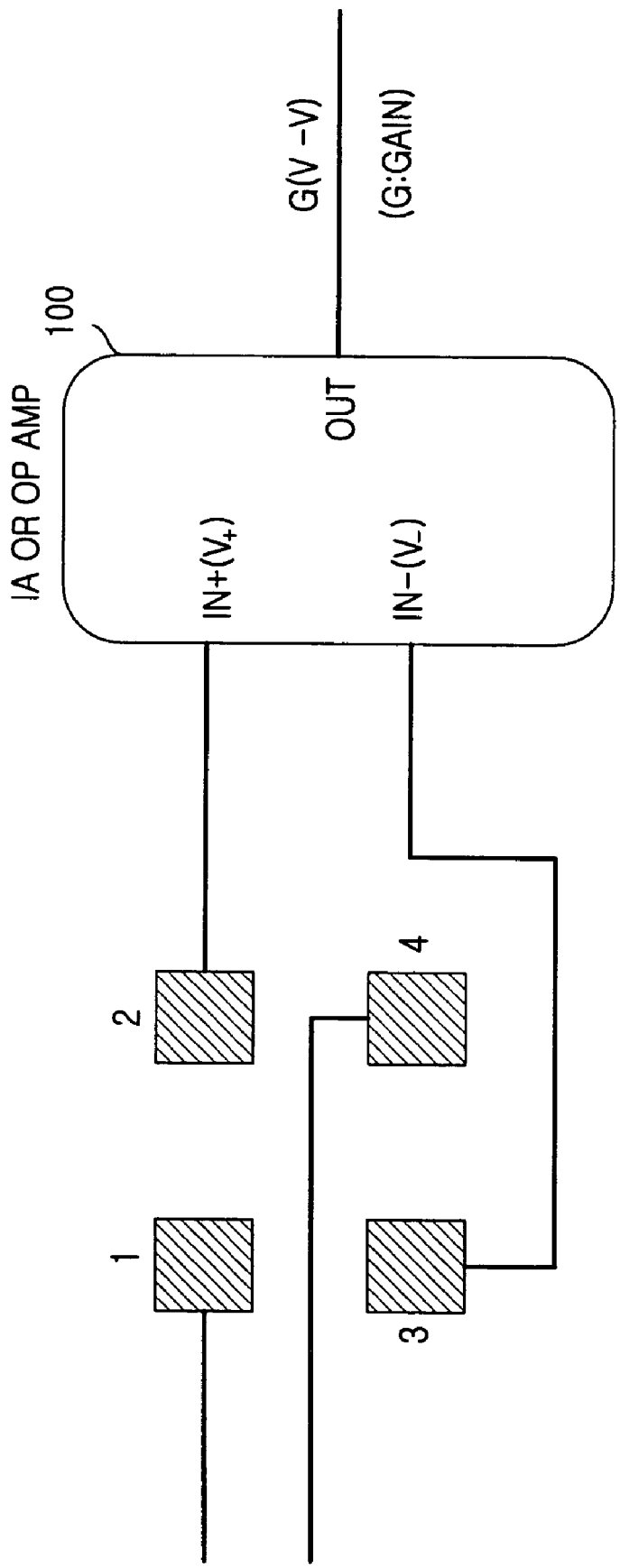
FIG. 3 is a PCB layout of the temperature-comparison section of a temperature controller in an optical-communication device of the present invention.

FIG. 3 is a PCB layout of the temperature-comparison section of a temperature controller in an optical-communication device of the invention.

As shown in FIG. 3, the temperature-comparison section of the temperature controller of the invention is designed in such a manner that a differential amplifier 100, e.g., IA and OPA, can execute positive and negative input using resistance pads 1 to 4 at the front end in a single PCB.

The resistance pads include the first resistance pad 1 connected to a temperature sensor, the second resistance pad 2 connected to an anode terminal of the differential amplifier 100, the third resistance pad 3 connected to a cathode terminal of the differential amplifier 100, and the fourth resistance pad 4 for receiving a signal corresponding to a set temperature. The resistance pads 1 to 4 are arranged so as to be spaced the same in vertical and horizontal distances from one another. Based upon a terminal into which the signal is inputted, a procedure for short-circuiting the resistance pads is provided. This procedure will be explained in detail in reference to FIGS. 4 and 5 as follows.

Figure 4:
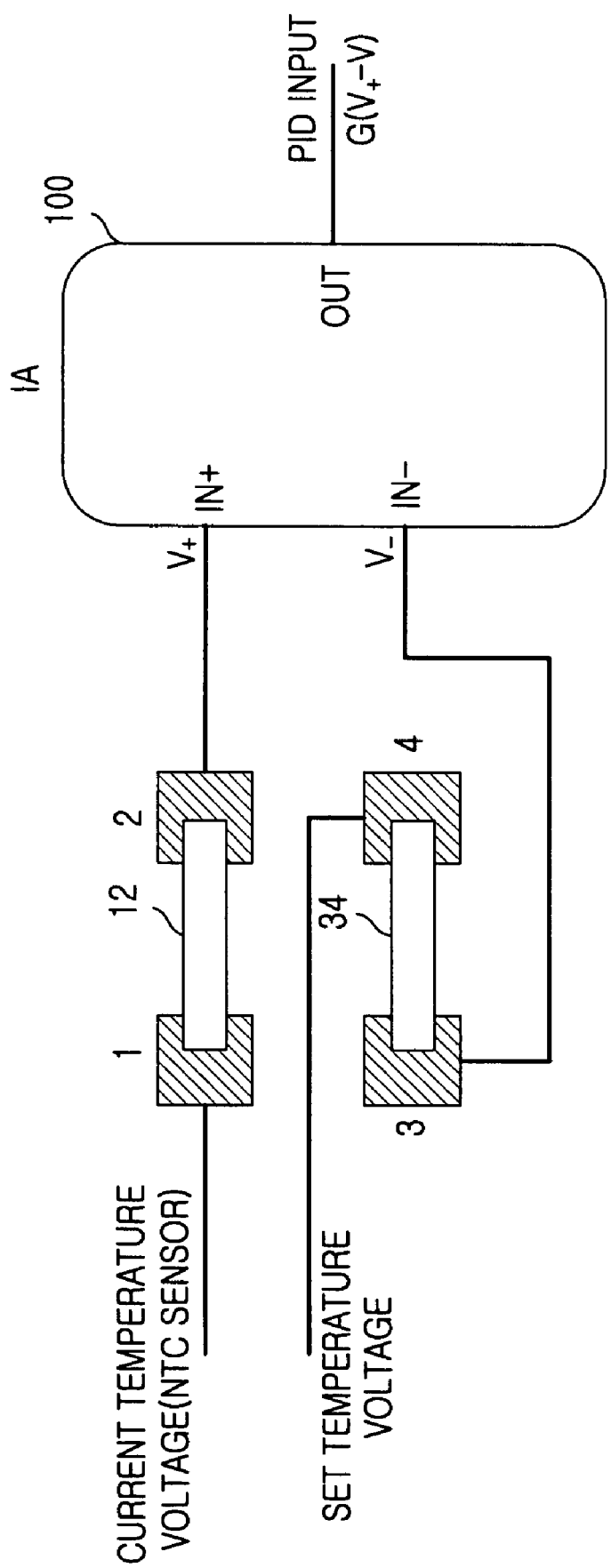
FIG. 4 is a PCB layout of the temperature-comparison section of the present invention using an NTC temperature sensor; and, FIG. 5 a PCB layout of the temperature comparison section of the present invention using a PTC temperature sensor.

FIG. 4 illustrates a PCB layout where an NTC sensor is used. The temperature controller using the NTC sensor has a current temperature voltage larger than a predetermined temperature voltage, and decreases the current temperature voltage through temperature control. In the temperature controller using the NTC sensor, the current temperature voltage is inputted into the anode terminal of the IA 100 and the predetermined temperature voltage is inputted into the cathode terminal of the IA 100.

Referring to FIG. 4, in order to input the current temperature detected via the NTC sensor into the anode terminal of the IA 100, the first and second resistance pads 1 and 2 are short-circuited with each other via a resistor 12 of 0 Ω. In order to input the predetermined temperature into the cathode terminal oft he IA 100, the third and fourth resistance pads 3 and 4 are short-circuited with each other via a resistor 34 of 0 Ω.

Figure 5:
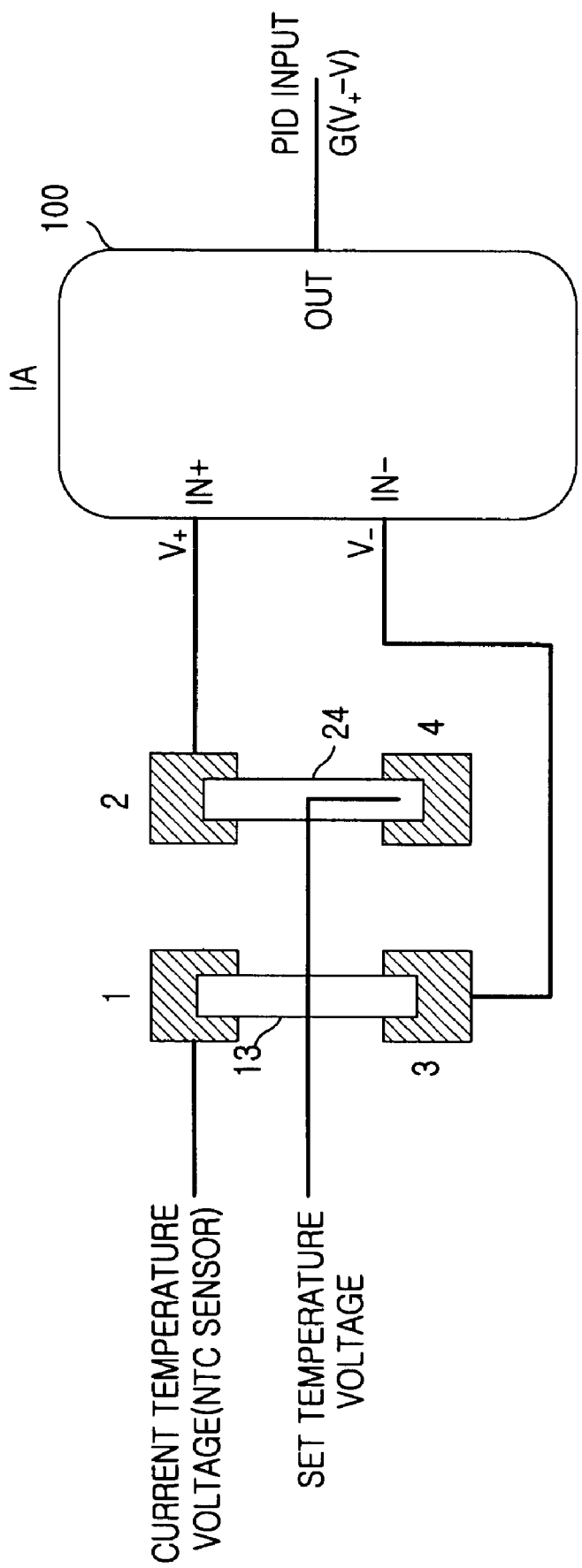

FIG. 5 illustrates a PCB layout where a PTC temperature sensor is used. The temperature controller using the PTC sensor has a current temperature voltage less than a predetermined temperature voltage and increases the current temperature voltage through temperature control. In the temperature controller using the PTC sensor, the current temperature voltage is inputted into the cathode terminal of the IA 100 and the predetermined temperature voltage is inputted into the anode terminal of the IA 100.

Referring to FIG. 5, in order to input the current temperature detected via the PTC sensor into the cathode terminal of the IA 100, the first and third resistance pads 1 and 3 are short-circuited with each other via a resistor 13 of 0 Ω. In order to input the predetermined temperature into the anode terminal of the IA, the second and fourth resistance pads 2 and 4 are short-circuited with each other via a resistor 24 of 0 Ω.

As set forth above, the present invention can selectively short-circuit the first to fourth resistance pads with one another according to the temperature sensor in use for the temperature controller so as to vary the polarity of signals inputted to the differential amplifier. Therefore, the PTC and NTC sensors can be used simultaneously resulting in cost and time savings because the manufacturing of additional PCB's is not necessary.

While the present invention has been shown and described in connection with the preferred embodiment, it is to be understood that those skilled in the art can make various modifications and variations to the present invention without departing from the spirit and scope of the appended claims. For example, the voltage applied to the input terminal of the IA or OPA in addition to the temperature controller can be varied according to short-circuiting methods of the resistance pads. Accordingly the scope of the present invention is not to be restricted to the foregoing embodiment of the invention but shall be defined by the following claims and the equivalents thereof.

What is claimed is:

1. A temperature controller used in an optical-communication device for conforming a current temperature, comprising:
   a temperature sensor having a NTC sensor and a PTC sensor on a single PCB for detecting the current temperature; and,
   a temperature-comparison section for comparing the current temperature detected by the temperature sensor with a predetermined temperature indicative of a proper operating temperature for the device, the temperature-comparison section comprising,
      a differential amplifier for outputting a difference between signals which are inputted respectively into anode and cathode terminals thereof;
      a first resistance pad connected to the temperature sensor;
      a second resistance pad connected to the anode terminal of the differential amplifier and spaced from the first resistance pad;
      a third resistance pad connected to the cathode terminal of the differential amplifier and spaced from the first and second resistance pads; and,
      a fourth resistance pad for receiving a signal corresponding to the predetermined temperature and spaced from the first, second, and third resistance pads, wherein the first to fourth resistance pads are short-circuited with one another selectively according to one of the NTC or PTC sensors so as to vary the polarity of the signals inputted into the differential amplifier.

2. The temperature controller according to claim 1, wherein the temperature sensor comprises an NTC sensor, the first and second resistance pads being short-circuited with each other, and the third and fourth resistance pads being short-circuited with each other.

3. The temperature controller according to claim 1, wherein the temperature sensor comprises PTC sensor, the first and third resistance pads being short-circuited with each other, and the second and fourth resistance pads being short-circuited with each other.

4. The temperature controller according to claim 1, further comprising at least one resistor having a resistance of 0 Ω which short-circuits the resistance pads with one another.

5. A method of maintaining the temperature of an optical-communication device, comprising:
   detecting a current temperature of the device;
   comparing the current temperature to a predetermined temperature;
   generating a signal which represents a difference between the current temperature and the predetermined temperature; and,
   providing a plurality of resistance pads that are selectively short-circuited with one another on a single PCB according to one of a PTC sensor and a NTC sensor so as to vary the polarity of the signals inputted into the differential amplifier.

\* \* \* \* \*